Figure 1:
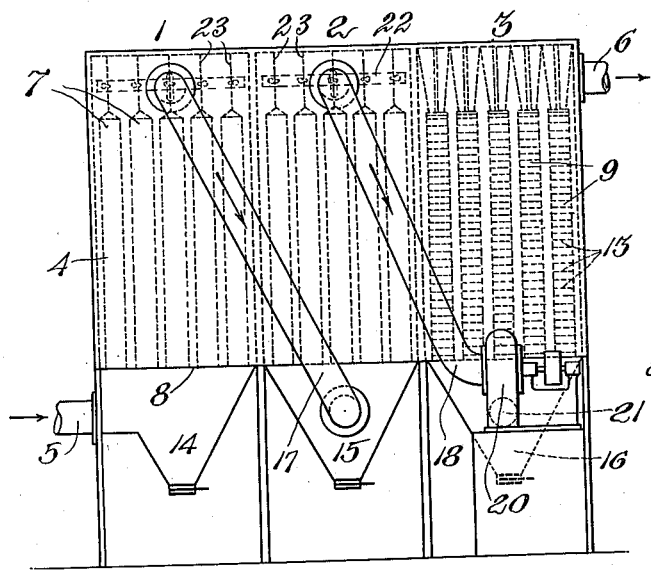

C. F. MOORE.
METHOD OF PURIFYING GAS.
APPLICATION FILED DEC. 17, 1913.

1,184,006.

Patented May 23, 1916.

Witnesses:
K. D. McPhail
A. C. Richardson.

Inventor:
Carlton F. Moore
by Phillips Van Evera & Fish
Attorneys.

UNITED STATES PATENT OFFICE.

CARLTON F. MOORE, OF SALT LAKE CITY, UTAH, ASSIGNOR TO UNITED STATES SMELTING, REFINING & MINING COMPANY, A CORPORATION OF MAINE.

METHOD OF PURIFYING GAS.

1,184,006.

Specification of Letters Patent. Patented May 23, 1916.

Application filed December 17, 1913. Serial No. 807,226.

*To all whom it may concern:*

Be it known that I, CARLTON F. MOORE, a citizen of the United States, residing at Salt Lake City, in the county of Salt Lake and State of Utah, have invented certain new and useful Improvements in Methods of Purifying Gas; and I do hereby declare the following to be a full, clear, and exact description of the invention, such as will enable others skilled in the art to which it appertains to make and use the same.

The invention relates to a method of purifying dust laden gases from ore treating or other furnaces for use in the manufacture of sulfuric acid by the contact process.

In making sulfuric acid by the contact process in which a platinum catalyzer is utilized to bring about the oxidation of the sulfur dioxid contained in the gases passing over the catalyzer, it is essential that all dust or solid matter be removed from the gases before they are brought into contact with the catalyzer. The dust present in the gases from the burning sulfur, pyrites and blend of ore treating or other furnaces, even if in minute quantities, is sufficient to render the platinum catalyzer inactive, since millions of cubic feet of gas are passed through the catalyzer chamber in a single campaign. Accordingly, the accepted method for purifying gas in the contact process is to pass it through dust collecting flues and then through scrubbers consisting of chambers filled with crushed quartz or other inert material over which water or acid is passed. A large proportion of the cost of manufacturing contact acid is due to the expense of installing and maintaining this scrubbing apparatus, which has been considered essential to the successful and continuous production of the pure gas required for the commercial manufacture of contact acid.

It is the object of the present invention to provide a method for continuously and economically removing by filtration all mechanically suspended particles of solid matter in the sulfur dioxid carrying gases utilized in making sulfuric acid.

Gases from ore treating and other furnaces have heretofore been freed from dust to a greater or less extent by filtering through bags. While the gases are sufficiently purified for some purposes by this method, it has not heretofore been considered feasible to secure the continuous supply of pure gas requisite for the successful practice of the contact method of making sulfuric acid by the filtration of the dust laden gases through bags. Heretofore it has been the practice in filtering dust laden sulfur dioxid carrying gases through bags to remove the accumulation of dust from the interior of the bags at comparatively frequent intervals, either by shaking the bags or by passing a current of air through the bags in the direction opposite to the flow of gases. This periodical cleaning of the bags is necessary, since the layer of dust accumulating upon the interior of the bags would otherwise soon become thick enough to prevent the passage of the gases through the bags. During the cleaning of the bags, more or less dust filters through the interstices between the strands of the fabric, and the fabric is also opened more or less by the agitation of the bags, so that when the gas is again turned on some of the dust passes through the fabric, and this continues until the openings become plugged up by the accumulation of the dust on the interior of the bags. Although the amount of dust passing through the fabric during and after each cleaning is comparatively small, yet it is sufficient to prevent the continuous supply of pure gas requisite for the manufacture of sulfuric acid by the contact process.

In accordance with the present invention, the continuous removal of all the particles of dust from the gases is secured by filtering the gases successively through a series of bags or fabrics and periodically removing the accumulated dust from the fabrics or bags only which precede the final fabric or bags of the series. In practising this method, the final fabric from which the gas passes to the catalyzer chamber is not disturbed or cleaned during the continuance of the process, while the preceding fabrics of the series may be cleaned as required to enable the dust laden gases to be successively passed through them. At each cleaning of the first series of fabrics a comparatively small quantity of dust will pass the fabric, and this dust will gradually accumulate upon the second of the series of fabrics. The accumulation will be comparatively slow, however, and cleaning of the second fabric will be necessary only at infrequent intervals. Whatever minute quantities of dust may pass this fabric will be removed by the third fabric, which is preferably the final fabric, from which the gas passes to the catalyzer chamber. The amount of dust which reaches this final fabric is so small in quantity that it may be allowed to accumulate indefinitely without the formation of a layer thick enough to prevent the passage of the gases through the fabric. This fabric is preferably supported in fixed position so that it will not be agitated by fluctuations in the pressure of the gas passing through it, and thus all danger of disturbing the dust which accumulates on the fabric during the running of the apparatus is avoided. To insure the removal of all the remaining particles of dust by the passage of the gas through the final fabric, especially at the beginning of the process, the interstices of the fabric may be filled with dust before passing any gases therethrough.

This method of filtration enables a continually pure sulfur dioxid carrying gas suitable for use in making contact acid to be economically supplied from ore treating or other furnaces. The method may also be used for securing a continually pure supply of gas for other purposes. Any suitable apparatus may be employed in practising the method, and in the drawings one form of such apparatus is indicated.

Figure 2:
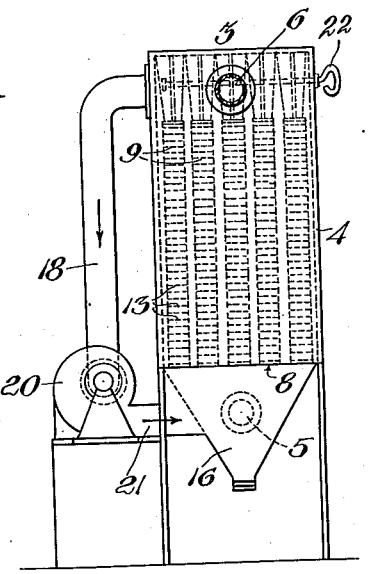
Figure 3:
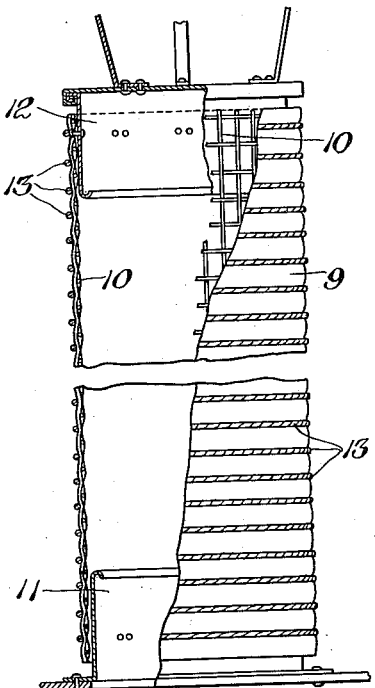

In the drawings, Figure 1 is a side elevation of an apparatus adapted for use in practising the invention; Fig. 2 is an end elevation; and Fig. 3 a detail showing one manner of supporting the final bags in fixed position.

The apparatus shown in the drawings comprises a bag chamber 4 which is divided into three sections 1, 2 and 3, and is provided with an inlet 5 through which the dust laden gases are supplied to the first section, and an outlet 6 through which the purified gases are discharged. Sections 1 and 2 are provided with bags such as are usually employed in bag-house practice, the bags being suspended at the upper end from the casing and may be shaken by means of the movable frames 22 attached to the suspending rods 23. The bottom of the bags are attached to the usual collars or thimbles of the thimble floor 8. Section 3 is provided with bags 9 which are supported in fixed position by a cylinder 10 of wire cloth which surrounds the lower thimble 11 and the upper closed thimble 12. The bags are retained in position on the wire cylinders by cords 13. Below the thimble floor are closed hoppers 14, 15 and 16, through which the gases are supplied to the respective sections. A pipe 17 connects section 1 of the casing with the hopper 15, and a pipe 18 connects section 2 with a fan 20 which is in turn connected with the hopper 16 through a pipe 21.

In practising the method, the sulfur dioxid laden gases from the furnace, previously cooled to a degree not destructive to the fabric of the bags, are admitted through pipe 5 to hopper 14, and flow through the thimbles in the floor 8 and through the bags 7 into section 1 of the bag chamber. The larger portion of the dust carried by the gases is retained by the bags in this section, and the partially purified gases flow through pipe 17 to hopper 15 and through the bags into section 2 of the bag chamber. Substantially all of the dust remaining in the gas is removed by the bags in section 2, and the gas then passes through pipe 18, fan 20, and pipe 21 into the hopper 16, and through the fixed bags 9 into section 3 of the bag chamber. Any particles of dust which may have passed through the bags of section 2 are removed by the fixed bags of section 3, and the purified gas passes out through the outlet 6 and to the catalyzer chamber of the acid making apparatus.

The accumulation of dust on the interior of the bags in section 1 will be comparatively rapid, and these bags must be shaken or otherwise cleaned at frequent intervals in order that the flow of gas may not be seriously impeded. The accumulation of dust on the interior of the bags of section 2 will be comparatively slow, since the accumulation of the dust on the bags of section 1 after each cleaning will quickly render the filtration effected by the bags of section 1 nearly perfect. It will be necessary, however, at infrequent intervals, to clean the bags of section 2, and this will result in small quantities of dust passing through the bags of this section. The quantity of dust passing through the bags of section 2 will, however, be so minute that the accumulation of dust upon the interior of the fixed bags of section 3 may continue indefinitely, or for years, without impeding the passage of the gas through the fabric. Since the usual filter bag fabric is rendered more efficient as a filtering material by the accumulation therein of dust which plugs the openings through the fabric, it is preferred to apply a thin layer of dust or similar material to the interior of the fixed bags in section 3.

Having explained the nature and object of the invention, what is claimed is:—

1. The method of purifying the dust laden gases from ore treating and other furnaces which consists in passing the gases successively through a series of filtering fabrics, the final fabric of which is impregnated with dust preparatory to filtering use, and periodically removing the accumulation of dust from those fabrics only which precede the final fabric.

2. The method of purifying gases from ore treating and other furnaces to obtain an impurity free gas, comprising continuously passing the gases successively through a series of movable filtering walls which become periodically impregnated and clogged with dust for removing the bulk of the dust and finally passing the gases through a quiescent dust impregnated filtering means for removing the last portion of dust.

3. The method of treating sulfur dioxid carrying gases from ore treating and other furnaces to obtain a dust free gas, comprising passing the gases through a series of movable filtering mediums whereby the bulk of the dust which accumulates upon the material can be periodically removed, successively removing portions of the dust as it progresses through the series of filtering mediums and leading the gas into a fixed filtering medium for removing the last traces of dust.

4. The method of treating sulfur dioxid carrying gases from ore treating and other furnaces to obtain a dust free gas consisting in passing the gas through a series of movable filtering fabrics, the first of the series to remove the bulk of the dust and to be periodically discharged of the dust, the next in the series to remove most of the dust resulting from the first treatment and to be periodically discharged of dust at less frequent intervals than the first fabric and finally leading the purified gas through a fixed dust impregnated fabric to remove the last traces of dust.

CARLTON F. MOORE.

Witnesses:
A. G. BRIGGY.
K. JORDAN.